(12) United States Patent
Staats et al.

(10) Patent No.: US 9,908,154 B2
(45) Date of Patent: Mar. 6, 2018

(54) METHODS AND SYSTEMS FOR TARGET CLEANING DIE SURFACES OF A DIE OF A PRESS MACHINE

(71) Applicant: HONDA MOTOR CO., LTD., Tokyo (JP)

(72) Inventors: Doug Staats, West Liberty, OH (US); Milan Jurich, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 702 days.

(21) Appl. No.: 14/520,663

(22) Filed: Oct. 22, 2014

(65) Prior Publication Data

US 2016/0114380 A1    Apr. 28, 2016

(51) Int. Cl.

| | |
|---|---|
| *B21B 45/02* | (2006.01) |
| *B08B 1/00* | (2006.01) |
| *B21D 22/02* | (2006.01) |
| *B21J 13/00* | (2006.01) |
| *B25J 9/00* | (2006.01) |
| *B25J 11/00* | (2006.01) |
| *B30B 15/00* | (2006.01) |
| *B08B 15/04* | (2006.01) |

(52) U.S. Cl.
CPC ............. *B08B 1/002* (2013.01); *B08B 1/00* (2013.01); *B21B 45/02* (2013.01); *B21D 22/02* (2013.01); *B21J 13/00* (2013.01); *B25J 9/0018* (2013.01); *B25J 11/00* (2013.01); *B30B 15/0082* (2013.01); *B08B 15/04* (2013.01)

(58) Field of Classification Search
CPC ........... B08B 1/002; B08B 1/00; B08B 15/04; B21D 22/02; B21J 13/00; B25J 9/0018; B25J 11/00; B30B 15/0082; B21B 45/02

USPC ........................................................ 72/40, 39
See application file for complete search history.

(56) References Cited

U.S. PATENT DOCUMENTS

| | | | | |
|---|---|---|---|---|
| 3,379,044 A | * | 4/1968 | Kirschner | B21B 28/04 72/236 |
| 4,958,398 A | | 9/1990 | Schmidt | |
| 5,953,944 A | * | 9/1999 | Groening | B21C 9/00 72/282 |
| 6,516,645 B2 | * | 2/2003 | Morales | B08B 7/0092 29/90.7 |
| 7,204,110 B2 | * | 4/2007 | Hammar | B08B 1/04 29/DIG. 96 |

(Continued)

FOREIGN PATENT DOCUMENTS

| | | |
|---|---|---|
| DE | 3123396 | 1/1983 |
| EP | 0533021 | 3/1993 |
| GB | 1228671 | 4/1971 |

*Primary Examiner* — David B Jones
(74) *Attorney, Agent, or Firm* — Armstrong Teasdale LLP

(57) ABSTRACT

A stamping system includes a press machine having installed an upper die with an upper die surface and a lower die with a lower die surface. The upper die surface and the lower die surface each have a non-planar geometry. The press machine presses a workpiece between the upper die surface and the lower die surface during a pressing operation. A die cleaning machine is provided having a brush configured to remove foreign debris from at least one of the upper die surface and the lower die surface during a cleaning operation, wherein the die cleaning machine is configured to maneuver the brush in various orientations relative to the press machine to clean the non-planar upper die surface or the non-planar lower die surface.

19 Claims, 2 Drawing Sheets

(56) References Cited

U.S. PATENT DOCUMENTS

| | | | |
|---|---|---|---|
| 7,346,954 B2* | 3/2008 | Weber | A46B 3/18 15/102 |
| 2013/0067981 A1* | 3/2013 | Lo | B23P 13/00 72/340 |
| 2016/0114380 A1* | 4/2016 | Staats | B08B 1/002 72/17.3 |

* cited by examiner

METHODS AND SYSTEMS FOR TARGET CLEANING DIE SURFACES OF A DIE OF A PRESS MACHINE

BACKGROUND

The present disclosure relates generally to methods and systems for target cleaning die surfaces of a die of a press machine.

During a stamping operation, foreign debris or contaminates have the potential to cause blemishes or defects in the workpiece being formed when such foreign debris is trapped between the workpiece and the die surfaces of the die of the press machine. When the workpiece is identified as having a blemish or defect caused by contaminates on the die surface and negatively affecting its fitness for use, the following steps typically take place to remedy the situation. The press machine is cycle-stopped and the press machine is secured such that the press machine is unable to operate. Safety gates are raised around the area surrounding the press machine. A human operator procures cleaning material, for example a lint-free towel, and then enters the press machine space. The operator attempts to locate the contaminate causing the defect. The operator wipes the area of the die surface containing the contaminate to remove the contaminate. The operator exits the press machine space and the safety gates are lowered. The press machine is reset and restarted.

Productivity, safety and quality are main concerns related to the above process. Because all of the machines in the area are shut down, productivity and press machine efficiency are negatively affected. The time required to accomplish the above procedure may be several minutes. Additionally, any time the operator enters the press machine space, there exists the potential for injury. Furthermore, frequently, due to their small size, the contaminates are difficult to see and with the current technique of wiping the die surface with a lint-free towel, the contaminates may be moved off of one location on the die surface to another location on the die surface, and are not removed from the die space, thus risking causing further defects.

A need remains for a stamping system capable of performing die cleaning in a cost effective and reliable manner.

BRIEF DESCRIPTION

In one embodiment, a stamping system is provided including a press machine having installed within it an upper die with an upper die surface and a lower die with a lower die surface. The upper die surface and the lower die surface each have a non-planar geometry. The press machine presses a workpiece between the upper die surface and the lower die surface during a pressing operation. A die cleaning machine is provided having a brush configured to remove foreign debris from at least one of the upper die surface and the lower die surface during a cleaning operation, wherein the die cleaning machine is configured to maneuver the brush in various orientations relative to the press machine to clean the non-planar upper die surface or the non-planar lower die surface.

In another embodiment, a stamping system is provided that includes a press machine having installed within it an upper die with an upper die surface and a lower die with a lower die surface. The press machine presses a workpiece between the upper die surface and the lower die surface during a pressing operation. The stamping system includes a workpiece surface inspection system configured to inspect a surface of the workpiece after the pressing operation to identify defects in the workpiece. The stamping system includes a die cleaning machine having a brush configured to remove foreign debris from at least one of the upper die surface and the lower die surface during a cleaning operation. The stamping system includes a control module operably coupled to the workpiece surface inspection system and the die cleaning machine. The control module causes the die cleaning machine to target cleaning of a specific area of the upper die surface or the lower die surface based on detected defects.

In a further embodiment, a method of stamping a workpiece is provided that includes pressing a workpiece between an upper die and a lower die, inspecting the workpiece to identify defects, identifying a debris target zone of a die surface of at least one of the upper die or the lower die based on the location of the defect, and causing a brush of a die cleaning machine to target clean the debris target zone to remove foreign debris from the debris target zone.

DETAILED DESCRIPTION

Various embodiments of methods and systems for cleaning dies of a die of a press machine are provided. It should be noted that although the various embodiments are described in connection with the automotive industry, such as for an automobile assembly process, one or more embodiments may be implemented in different industries and for different applications.

One or more embodiments include a die cleaning machine used to remove foreign debris from a die surface of an upper die and/or a lower die. The die cleaning machine removes the foreign debris from a targeted area of the die surface, which may be identified by an inspection system that inspects formed workpieces for defects and, based on the location of the defect, the die cleaning machine is able to automatically target the particular area of the die surface having the foreign debris. Removal of such debris is performed by an automated machine as opposed to by a human operator physically wiping the die surface with a cloth. As such, downtime of the overall stamping system is reduced, increasing throughput of the workpieces. Additionally, risk of injury is reduced by automating the cleaning process.

Figure 1:
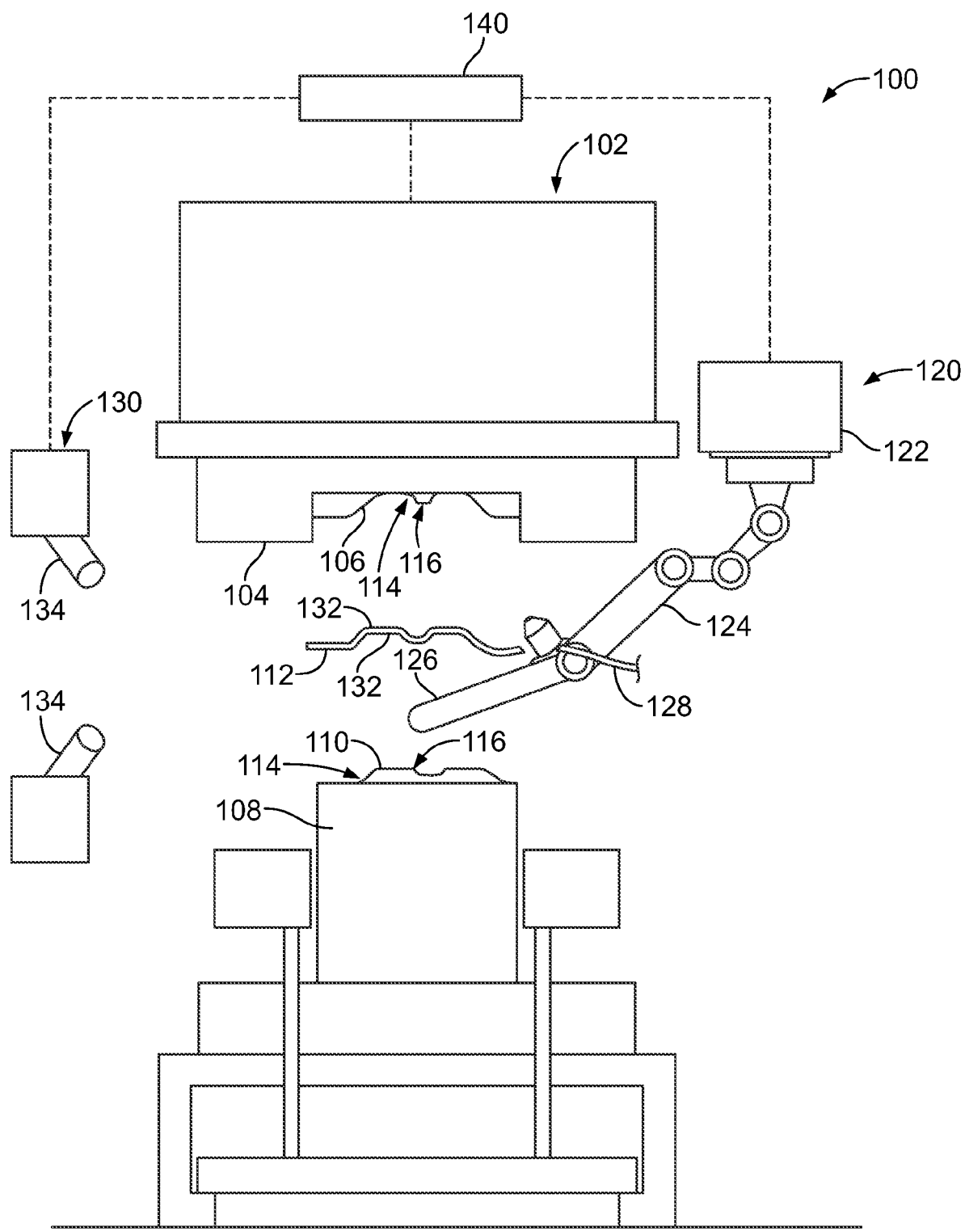
FIG. 1 is a schematic illustration of a stamping system in accordance with one embodiment.

FIG. 1 is a schematic illustration of a stamping system 100 in accordance with one embodiment. The stamping system 100 includes a press machine 102 having an upper die 104 with an upper die surface 106 and a lower die 108 with a lower die surface 110. The press machine 102 is used to press a workpiece 112 between the upper die surface 106 and the lower die surface 110 to form or shape the workpiece 112 during a pressing operation. The pressing operation of the stamping system 100 may be a stamping process, a forming process, a drawing process, a shaping process, a trimming process, a piercing process, a bending process, or another metal working process that is used to manipulate or change the workpiece 112 into a usable component, for example, but not limited to, a panel or hood of a vehicle.

In an exemplary embodiment, the upper die surface 106 and the lower die surface 110 are complementary. The upper die surface and the lower die surface 110 may have non-planar geometries. For example, portions of the upper die surface 106 and the lower die surface 110 may be curved or angled. Portions of the upper die surface 106 and the lower die surface 110 may be concave, convex, or have other complex geometries. For example, FIG. 1 illustrates the die surfaces 106, 110 with concave portions 114 and convex portions 116.

The stamping system 100 includes a die cleaning machine 120 positioned adjacent the press machine 102. The die cleaning machine 120 and press machine 102 may be arranged as part of a vehicle assembly line process. The die cleaning machine 120 is used to remove foreign debris from the press machine 102 that have the potential to cause blemishes or defects on the finished part when trapped between the workpiece 112 being formed and the die surface 106 or 110. Optionally, multiple press machines 102 may be provided in the same vicinity and the die cleaning machine 120 may be used to clean some or all of the press machines 102.

The die cleaning machine 120 includes a robot 122 having an arm 124 configured to move in three dimensional space (e.g., movable in X, Y and Z directions). A brush 126 is provided at an end of the arm 124. The brush 126 may be any type of cleaning device, such as a micro-cleaning brush that uses micro-moistened filament to create capillary adhesive forces between the filaments and the particles to remove the particles from the die surfaces 106, 110. The brush 126 may have antistatic cleaning liquid applied to the filaments of the brush to attract the particles to the brush 126 and remove the particles from the die surfaces 106, 110. The brush 126 may be elongated, such as an oval shape. In alternative embodiments, the brush 126 is circular and rotated about a central axis. The brush 126 may be rotatable to help remove the debris from the area of interest. Optionally, the die cleaning machine 120 may include a vacuum system 128 associated with the brush 126 to remove the debris from the brush 126 and from the area being cleaned so that the brush 126 does not simply wipe or move the debris to another location of the die surface 106, 110.

The arm 124 may be movable vertically (e.g., up and down), horizontally (e.g., left and right) and/or may be rotated by the robot 122. The arm 124 may have multiple joints that allow movement of the brush 126 in many directions. As such, the brush 126 may be manipulated into many different orientations, such as at various angles, locations and the like for cleaning all areas and contours of the die surfaces 106, 110.

In an exemplary embodiment, the stamping system 100 includes a workpiece surface inspection system 130 configured to inspect a surface 132 of the workpiece 112 after the pressing operation to identify defects in the workpiece 112. The inspection system 130 may be an automated surface inspection system, such as a vision system having one or more cameras 134 used to inspect the surface(s) 132 for defects. Any type of inspection system 130 capable of identifying defects in the workpiece 112 may be used in various embodiments. The inspection system 130 identifies the location of the defect on the workpiece 112 and correlates the location of the defect to a debris target zone of one or both of the die surfaces 106, 110 based on the location of the defect.

The inspection system 130 may be used to inspect the workpiece 112 while still at the press machine 102. Alternatively, the workpiece 112 may be inspected after the workpiece 112 is moved to a different location, such as a designated inspection station, to the next press machine 102 and the like. Optionally, multiple inspection systems 130 may be provided, such as after each press machine 102, such that the workpiece 112 may be inspected multiple times during the stamping process. Alternatively, a single inspection system 130 is provided, however the workpiece 112 may be brought to the inspection system 130 multiple times during the stamping process. In other alternative embodiments, the workpiece 112 is only inspected a single time after all of the stamping processes are completed. The inspection system 130 may be able to identify which press machine 102 has the debris based on the location or the type of defect detected to allow the die cleaning machine 120 to clean the appropriate die surface.

The stamping system 100 is able to target the cleaning process of the die cleaning machine 120 based on the location of the defect and the identified debris target zone. For example, the inspection system 130 may identify a plurality of areas or zones and may scan the various zones for defects. The workpiece 112 may be sectioned into any number of inspection zones having any size. The inspection zones may all be approximately the same shape and size (e.g., 2"×2" zones), or alternatively, the workpiece 112 may have differently sized or shaped inspection zones. The inspection zones may be arranged in rows and columns and separately identified. For example, a given workpiece 112 may have rows 1-12 and columns A-G used to identify relative coordinates of the workpiece. A defect(s) may be identified by the inspection system 130 as being in inspection zone B-4 (e.g., in an front-left area of the workpiece) and the inspection system 130 may cause the die cleaning machine 120 to target cleaning and debris removal in a corresponding area, or debris target zone, of the die surface 106 or 110 (e.g., the front-left area of the die surface 106 or 110). For example, the die surfaces 106, 110 may have a similar arrangement of debris target zones arranged in rows and columns that correspond to the rows and columns of inspection zones. Optionally, the inspection system 130 may be capable of identifying if the defect has occurred on the upper surface or the lower surface of the workpiece 112, and thus cause the die cleaning machine 120 to clean the upper die surface 106 or cause the die cleaning machine 120 to clean the lower die surface 110.

A control module 140 is operably coupled to the workpiece surface inspection system 130 and the die cleaning machine 120. For example, the control module 140 causes the die cleaning machine 120 to target cleaning of a specific area of the upper die surface 106 or the lower die surface 110 based on detected defects identified by the inspection system 130.

The control module 140 receives inputs from the inspection system 130 relating to the location of defects. Optionally, raw data may be transmitted from the inspection system 130 to the control module 140 and the control module 140 may process the raw data received to determine if a defect is present and/or the location of the defect and/or the target location for cleaning (e.g., debris target zone). Alternatively, the inspection system 130 may process at least some of the data, such as to determine if a defect is present and/or the location of the defect and/or the target location for cleaning.

In other alternative embodiments, the die cleaning machine 120 may be used to process at least some of the data, such as to determine the target location for cleaning based on the determined location of the defect. Once a defect is detected and the debris target zone is identified, the control module 140 controls operation of the stamping system 100 to clean the die surface(s) 106, 110.

The control module 140 controls movement of the robot 122, such as to control the position of the arm 124 and brush 126 relative to the die surfaces 106, 110 of the die of the press machine 102. The movement of the brush 126 is controlled to target the particular location where the debris has been determined to be located. The movement of the brush 126 is controlled to attack the die surface(s) 106, 110 from an efficient and/or optimal orientation. The brush 126 orientation is selected based on the angle and/or curvature of the die surface 106, 110 at the debris target zone. The control module 140 may be operably coupled to the brush 126, such as to control an ON/OFF state of the brush 126 during cleaning of the die surfaces 106, 110 during a cleaning operation. Optionally, the brush 126 may be configured to change shape, such as by changing positions of internal rollers of the brush 126. The control module 140 may control the shape of the brush 126, such as to enhance the cleaning ability of the brush 126 by allowing the brush 126 to more intimately contact the die surface 106, 110 based on the target location that is being cleaned.

The control module 140 may be operably coupled to the press machine 102 to control the stamping or pressing operation of the upper and/or lower die 104, 108. The control module 140 may pause or stop the press machine 102 to allow automated cleaning of the die surfaces 106, 110 by the die cleaning machine 120, such as when a defect is detected in the workpiece 112.

The control module 140 may form part of or be embodied as one or more computing systems, such as one or more programmable logic controllers (PLCs). It should be noted that while a particular computing or operating environment may be described herein, the computing or operating environment is intended to illustrate operations or processes that may be, implemented, performed, and/or applied to a variety of different computing or operating environments. Thus, FIG. 1 illustrates a non-limiting example of a controller that may perform one or more methods or processes as described in more detail herein.

The control module 140 may be provided, for example, as any type of computing device, including, but not limited to PLCs or personal computing systems, among others. The control module 140 may optionally include components not shown in FIG. 1, and/or some components shown in FIG. 1 may be peripheral components that do not form part of or are not integrated into the computing system. The control module 140 may include one or more physical devices configured to execute one or more instructions. For example, the control module 140 may be configured to execute one or more instructions that are part of one or more programs, routines, objects, components, data structures, or other logical constructs. Such instructions may be implemented to perform a task, implement a data type, transform the state of one or more devices, or otherwise arrive at a desired result.

The control module 140 may include one or more processors and/or computing devices that are configured to execute software instructions, such as programmed using application software. In some embodiments, one or more algorithms as described herein are embedded into the PLC. Additionally or alternatively, the control module 140 may include one or more hardware or firmware logic machines configured to execute hardware or firmware instructions. The control module 140 may optionally include individual components that are distributed throughout two or more devices, which may be remotely located in some embodiments, such as in the various machines, systems, and the like of the stamping system 100.

Thus, the various components, subsystems, or modules of the stamping system 100 may be implemented in hardware, software, or a combination thereof, as described in more detail herein. Additionally, the processes, methods, and/or algorithms described herein may be performed using one or more processors, processing machines or processing circuitry to implement one or more methods described herein.

Figure 2:
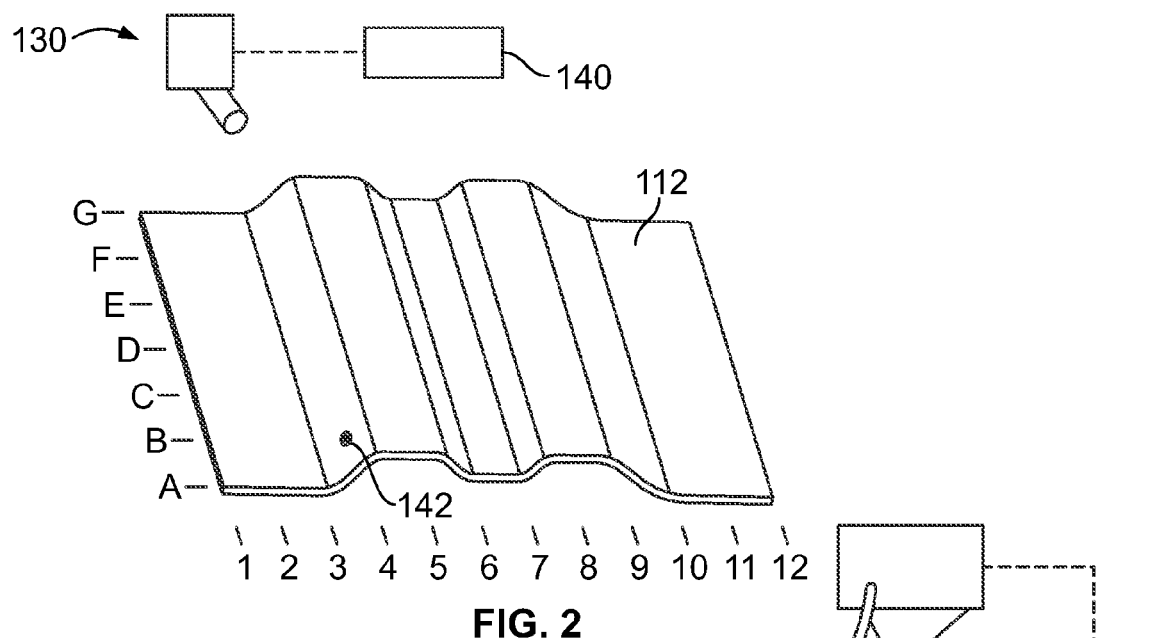
FIG. 2 is a top perspective view of a workpiece formed by the stamping system shown in FIG. 1 showing an inspection system inspecting and identifying a defect in the workpiece.

FIG. 2 is a top perspective view of the workpiece 112 at the inspection station with the inspection system 130 inspecting and identifying a defect 142 in the workpiece 112. The inspection system 130 and/or the control module 140 identifies the location of the defect 142, such as the coordinates of the defect on the workpiece 112. After such defect is identified, the control module 140 causes the die cleaning machine 120 (shown in FIG. 1) to clean the appropriate die surface.

Figure 3:
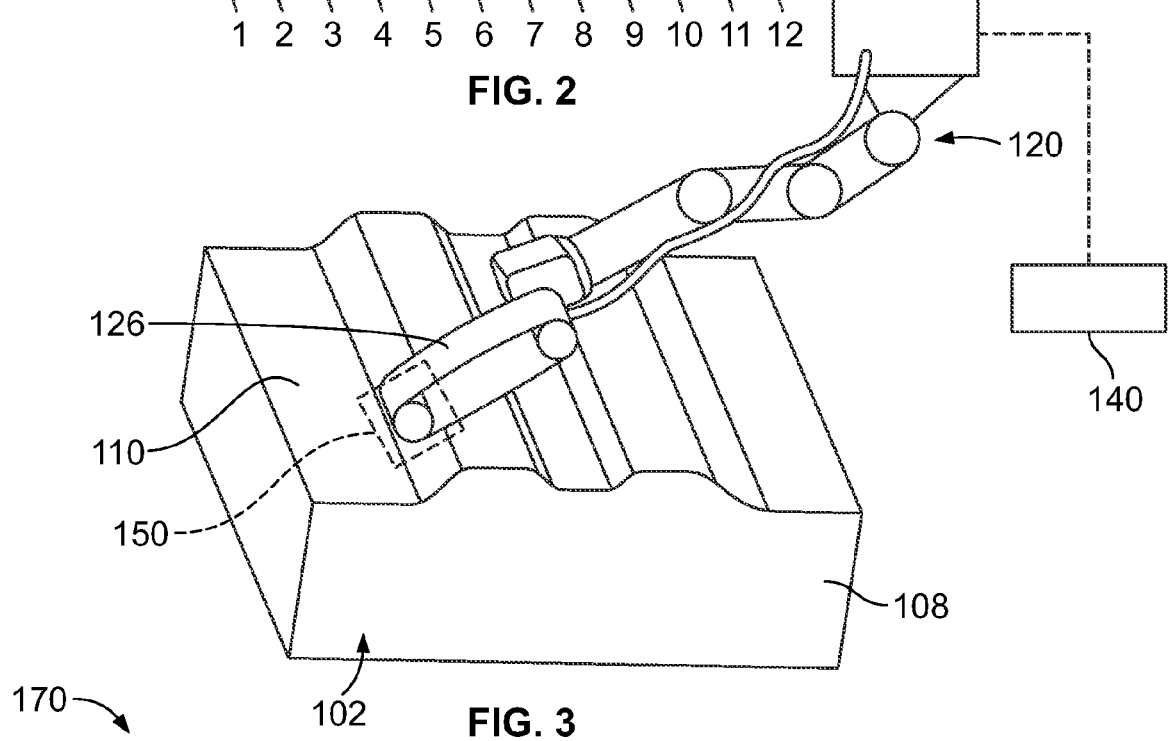
FIG. 3 illustrates a die cleaning machine of the stamping system shown in FIG. 1 cleaning a die surface of a die of a press machine of the stamping system.

FIG. 3 illustrates the die cleaning machine 120 cleaning the die surface 110 of the die of the press machine 102 (only the lower die 108 is illustrated in FIG. 3). The control module 140 directs the brush 126 to a debris target zone 150 to cause the brush to clean the debris target zone 150. The debris target zone 150 corresponds to the location of the defect 142 (shown in FIG. 2) identified by the inspection system 130 (shown in FIG. 2). By targeting the debris target zone 150 for cleaning, the cleaning time may be reduced as compared to a system set up to clean the entire die surface. As such, the down-time of the stamping system 100 is reduced. Additionally, by using the automated die cleaning machine 120, no human operator is required to enter the space of the press machine 102, which would create additional down-time and/or present a health risk to the human operator physically cleaning the die surface. The maneuverability of the brush 126 allows the die cleaning machine 120 to clean the non-planar geometry of the die surface 110.

Figure 4:
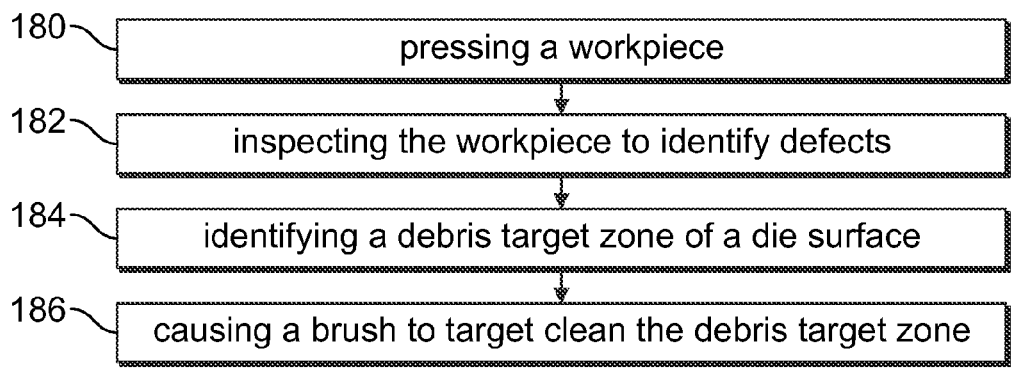
FIG. 4 illustrates a die cleaning method in accordance with an exemplary embodiment.

FIG. 4 illustrates a die cleaning method 170 in accordance with an exemplary embodiment. The method 170, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 170 may be able to be used as one or more algorithms to direct hardware to perform operations described herein.

The method 170 includes pressing 180 a workpiece between an upper die and a lower die against an upper die surface and a lower die surface. The pressing 180 may be performed at a press machine, such as by moving the upper die toward the lower die during a pressing operation. The pressing may cause the shape of the workpiece to change or may cause portions of the workpiece to be cut or removed.

The method 170 includes inspecting 182 the workpiece to identify defects. The inspection may be done by a workpiece surface inspecting system. The inspection may be done by a camera or other vision component capable of inspecting the surfaces of the workpiece for defects. The inspection system or a control module associated with the inspection system analyzes the inspection data to determine the location of the defect(s), such as by a coordinate identification system.

The method 170 includes identifying 184 a debris target zone of a die surface of the upper die and/or the lower die based on the location of the defect. The debris target zone may be identified using a look-up table that corresponds defect locations with die surface locations. The debris target zone may be identified by matching workpiece structures or landmarks with die surface structures or landmarks. For example, certain curves, holes, openings or edges of the workpiece may correspond to features of the die surface. Optionally, both the workpiece and the die surface may have coordinate grids associated therewith to identify the debris target zone. The debris target zone may be identified by the control module, by the inspection system or by the die cleaning machine itself.

The method 170 includes causing 186 a brush of a die cleaning machine to target clean the debris target zone to remove foreign debris from the debris target zone. The brush may target clean the debris target zone by operating a robot arm, with the brush attached to the arm, to position the brush in the debris target zone. The brush may target clean the area by manipulating the brush into a particular orientation (e.g., angle and location) based on the contour and features of the die surface at the debris target area. The brush is capable of being manipulated into many different angles and orientations to clean the non-planar geometries of the die surfaces. The brush is capable of target cleaning to avoid having to clean large areas, or even the entire area, of the die surface, which limits the down-time of the press machine.

The control module, or associated memory device, may store instructions for moving the brush and arm. The system is programmed so the brush targets and attacks the debris at predefined angles or orientations depending on the location of the debris. The best angle or orientation for removing the debris from each target zone may be predetermined and stored for each target zone. Optionally, the debris target zones may have multiple angles or orientations to attack the debris for removal and the brush may be moved to one or more of such angles or orientations.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, paragraph (f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

The foregoing description of embodiments and examples has been presented for purposes of illustration and description. It is not intended to be exhaustive or limiting to the forms described. Numerous modifications are possible in light of the above teachings. Some of those modifications have been discussed and other will be understood by those skilled in the art. The embodiments were chosen and described for illustration of various embodiments. The scope is, or course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A stamping system comprising:
   a press machine having installed an upper die with an upper die surface and a lower die with a lower die surface, the upper die surface and the lower die surface each having a non-planar geometry, the press machine being configured to press a workpiece between the upper die surface and the lower die surface during a pressing operation;
   a workpiece surface inspection system configured to inspect a surface of the workpiece to identify defects in the workpiece after the pressing operation; and
   a die cleaning machine having a brush configured to remove foreign debris from at least one of the upper die surface and the lower die surface during a cleaning operation, wherein the die cleaning machine is configured to maneuver the brush in various orientations relative to the press machine to clean the non-planar upper die surface or the non-planar lower die surface.

2. The stamping system of claim 1, wherein the brush rotates.

3. The stamping system of claim 1, wherein the brush is elongated.

4. The stamping system of claim 1, wherein the brush is attached to an arm of a robot, the arm being moveable in three-dimensional space.

5. The stamping system of claim 1, wherein the die cleaning machine includes a vacuum system to remove the debris from the brush.

6. The stamping system of claim 1, wherein the lower die surface includes a concave portion, the brush being configured to target and remove debris from the concave portion of the lower die.

7. The stamping system of claim 1, wherein the die cleaning machine is operated without human operator intervention in the space surrounding the press machine.

8. The stamping system of claim 1, wherein the workpiece surface inspection system identifies a debris target zone of the upper die or the lower die based on the location of the defect and causes the die cleaning machine to move the brush to the debris target zone of the upper die or the lower die to clean the debris in the debris target zone identified based on the location of the defect.

9. The stamping system of claim 1, further comprising a control module operably coupled to the workpiece surface inspection system and the die cleaning machine, the control module causing the die cleaning machine to target clean a specific area of the upper die surface or the lower die surface based on detected defects.

10. A stamping system comprising:
- a press machine having installed an upper die with an upper die surface and a lower die with a lower die surface, the press machine being configured to press a workpiece between the upper die surface and the lower die surface during a pressing operation;
- a workpiece surface inspection system configured to inspect a surface of the workpiece after the pressing operation to identify defects in the workpiece;
- a die cleaning machine having a brush configured to remove foreign debris from at least one of the upper die surface and the lower die surface during a cleaning operation; and
- a control module operably coupled to the workpiece surface inspection system and the die cleaning machine, the control module causing the die cleaning machine to target clean a specific area of the upper die surface or the lower die surface based on detected defects.

11. The stamping system of claim 10, wherein the brush rotates.

12. The stamping system of claim 10, wherein the brush is elongated.

13. The stamping system of claim 10, wherein the brush is attached to an arm of a robot, the arm being moveable in three-dimensional space.

14. The stamping system of claim 10, wherein the die cleaning machine includes a vacuum system to remove the debris from the brush.

15. The stamping system of claim 10, wherein the lower die surface includes a concave portion, the brush being configured to target and remove debris from the concave portion of the lower die.

16. The stamping system of claim 10, wherein the die cleaning machine is operated without human operator intervention in the space surrounding the press machine.

17. A method of stamping a workpiece, the method comprising:
- pressing a workpiece between an upper die and a lower die;
- inspecting the workpiece to identify defects;
- identifying a debris target zone of a die surface of at least one of the upper die or the lower die based on the location of the defect; and
- causing a brush of a die cleaning machine to target clean the debris target zone to remove foreign debris from the debris target zone.

18. The method of claim 17, wherein said inspecting the workpiece comprises inspecting the workpiece with an automated surface inspection system.

19. The method of claim 17, wherein said causing a brush to target clean comprises variously orienting the brush at various angles and positions to remove the foreign debris.

* * * * *